Patented Jan. 26, 1932

1,842,694

UNITED STATES PATENT OFFICE

CECIL SHAW, OF POLMONT, ROBERT FRASER THOMSON, OF GRANGEMOUTH, AND JOHN THOMAS, OF POLMONT, SCOTLAND, ASSIGNORS TO IMPERIAL CHEMICAL INDUSTRIES LIMITED, A CORPORATION OF GREAT BRITAIN

MANUFACTURE OF HALOGENATED DYES AND HALOGENATED INTERMEDIATES FOR DYES

No Drawing. Application filed April 16, 1931, Serial No. 530,722, and in Great Britain April 24, 1930.

This invention relates to an improved process for the halogenation of vat dyes and intermediates, and in particular to a process of halogenation in which such compounds are dissolved or suspended in the molten anhydride of a suitable organic acid and treated with the halogen or halogenating agent.

We have found that phthalic anhydride, succinic anhydride, and other suitable organic dicarboxylic acid anhydrides, in the liquid state possess very useful qualities as mediums for the halogenation of complex anthracene derivatives such as benzanthrone, dibenzanthrone, iso-benzanthrone, pyranthrone, indanthrone, Caledon red BN (i. e. anthraquinone-1:2:1':2'-naphthacridone), and related substances; they are also useful in the halogenation of simple anthraquinones, such as anthraquinone itself, 2-aminoanthraquinone, and the like.

Among the advantages of our improved process are the easy isolation of the product by extraction of the acid anhydride with hot water or dilute alkali, and simple regeneration of the anhydride in form suitable for re-use. We find also that many of the complex anthracene derivatives such as those above mentioned are soluble in molten phthalic and other dicarboxylic acid anhydrides.

The acid anhydrides which are suitable for use in accordance with our invention are those anhydrides of dicarboxylic acids which are readily prepared by simple heating of the dicarboxylic acid and which are molten (in the presence of the material to be halogenated) at temperatures below about 180° C. but are solid at ordinary temperatures and are not readily volatile; preferably they are sufficiently soluble in hot water to allow of removal by extraction with hot water, and are deposited either as anhydride or as free acid on cooling the hot aqueous solution.

Suitable acid anhydrides are, for example, phthalic anhydride, halogen-substituted phthalic anhydrides, succinic anhydride.

Our invention is illustrated but not limited by the following examples, in which the parts are by weight:

Example 1

100 parts of nitro dibenzanthrone such as may be made by nitration of dibenzanthrone in nitro-benzene with strong nitric acid (for example 95%) are suspended in 500 parts of molten phthalic anhydride and chlorine passed through at 100° C. The temperature is allowed to rise to 220° C. and maintained at that point and the current of chlorine maintained until no further change of shade in the dyestuff is observed when test samples are dyed on cotton.

The melt is then allowed to cool somewhat, and then run into hot water and boiled. The phthalic acid is removed by filtration and washing with hot water. The insoluble filter cake is dried. The product consists of a dark powder giving a deep violet solution in concentrated sulphuric acid. It dissolves in a solution of caustic soda and sodium hydrosulphite to give deep blue shades of excellent fastness on cotton.

The dyestuff is a highly chlorinated derivative of dibenzanthrone, and from analysis it appears that the product is a penta- or hexa-chlor dibenzanthrone derivative.

Example 2

20 parts of isodibenzanthrone are suspended in 100 parts molten phthalic anhydride and a trace of iodine added. Chlorination is done at 170–180° C.

The product is worked up as in the previous example, and dyes in fast violet shades.

Example 3

Dibenzanthrone itself may be chlorinated in a similar way, giving a blue dyestuff fast to moisture.

Example 4

One part of Caledon red B. N (anthraquinone naphthacridone) in the form of dry powder is added to 6 parts of molten phthalic anhydride and the temperature adjusted to 170° C. One part of liquid bromine is then run in slowly at this temperature and when it is in, the heating is continued and the temperature allowed to rise slowly to between 220° C. and 240° C., in which range it is then kept for three hours. At the end of these three hours the mass is allowed to cool to about 160° C., when it is poured out of the halogenation vessel, allowed to solidify, ground and extracted with hot water until all the phthalic acid has been removed. The product is then dried and ground and consists of a red powder dyeing cotton from the caustic soda sodium hydrosulphite vat red shades of excellent fastness, including fastness to kier boiling, and rather yellower in tone than Caledon red B. N.

Example 5

10 parts of dry di-anthraquinone 1:2:2'1' dihydroazine are added along with a trace of iodine to 50 parts of molten phthalic anhydride. Chlorine is then passed through the molten mass at a temperature of 160° C. to 180° C. until samples of the dyestuff on isolation, dyeing and bleaching show no further improvement in bleach fastness. The molten mass is then poured into trays and allowed to set. It is ground, extracted with boiling water, filtered, washed free from phthalic acid and dried.

The product consists of a blue powder dyeing cotton in bright shades of blue of much better fastness to chemic than the original material.

Example 6

50 parts of benzanthrone are dissolved in 500 parts of molten phthalic anhydride at 140° C. and chlorine passed through slowly until an isolated sample contains about 14%. The chlor-benzanthrone is isolated in a similar manner to the previous examples, and forms a dry yellow powder soluble in concentrated sulphuric acid to a bright carmine red.

The product consists substantially of Bzl chlorbenzanthrone. Highly substituted chlorbenzanthrone may be obtained by further treatment along the lines of Example 5.

Example 7

50 parts of isodibenzanthrone are added to 250 parts of molten phthalic anhydride and 80 parts of bromine run in slowly at 170° C., the mixture then being heated so that the temperature rises to 240° C. in 6 hours, when it is kept at this for 2 hours. The mixture is then allowed to cool, and worked up with water when it forms a dark powder dyeing cotton in deep blue violet shades from the vat.

Example 8

1 part of pyranthrone in the form of a dry powder is added to about 6 parts of molten phthalic anhydride and the temperature raised to about 170° C. 1 part of liquid bromine is then slowly run in and the heating then continued the temperature being allowed to rise slowly to between 220–240° C. in which range it is then kept for three hours. At the end of these three hours the mass is allowed to cool to about 160° C. when it is poured out of the halogenation vessel allowed to solidify, ground and extracted with hot water until all the phthalic acid has been removed.

The product then consists of an orange-red paste which dyes cotton in reddish shades of orange from the caustic soda sodium hydrosulphite vat. The redness of the shade can be varied by altering the amount of bromine used.

Example 9

7 parts of dry powdered dibenzanthrone are added to 40 parts of molten phthalic anhydride, and the temperature raised to 180° C. to 190° C. and then chlorine passed through. Under these conditions chlorination takes place readily, and various chlor derivatives may be isolated, as, for example, penta, hexa, and nona chlor dibenzanthrones. The particular derivative which is formed is governed largely by the amount of chlorine added, and, as already stated, chlorination takes place readily, so that production of those highly halogenated derivatives does not, in general, need chlorination for long periods.

Of special interest is the penta chlor derivative. This dyes in bright reddish blue shades greener than those obtained with dibenzanthrone itself and fast to moisture.

Example 10

This is similar to Example 9 except that by using more chlorine and prolonging the time of treatment a nona-chlor-dibenzanthrone is obtained.

Example 11

10 parts of anthraquinone are added to 100 parts of molten phthalic anhydride and chlorinated rapidly at 180° C. A mixture of chlor bodies appears to be obtained, and these can be separated in a similar way to the previous examples.

Example 12

10 parts of 2-amino-anthraquinone are added to 100 parts of molten phthalic anhydride, and chlorine passed in at a temperature of 200° C. until a sample shows that sufficient has been absorbed to give a monochlor-amino-anthraquinone.

The product, when worked up in the usual way, consists of a chlor phthalimide anthraquinone. This may be converted to aminoanthraquinone by hydrolysis, for example, with hydrochloric acid at 120° C. to 130° C. The product hydrolyzed in this way appears to consist substantially of 1-chlor-2-amino-anthraquinone.

*Example 13*

100 parts of dry pure dibenzanthrone are added to 600 parts of molten phthalic anhydride and chlorine passed through at a temperature of 175–180° C. until a sample on analysis shows a chlorine content corresponding to penta-chlor-dibenzanthrone.

The molten mass is then run into hot water and extracted until all the phthalic acid is removed. The product is a blue paste dissolving in warm alkaline hydrosulphite solution and dyeing cotton from a green-blue vat in blue shades of excellent fastness including fastness to water spotting.

*Example 14*

Instead of using dibenzanthrone as in Example 13, a mixture of dibenzanthrone and isodibenzanthrone can be substituted. This mixture, treated as in the above example, requires a slightly higher chlorine content to give the same fastness to water.

The products so obtained are similar to the penta-chlor-dibenzanthrone but are duller.

*Example 15*

100 parts of benzanthrone are dissolved in 600 parts of molten succinic anhydride at a temperature of about 150° C. and chlorine passed through until a test sample contains 14%. The chlor-benzanthrone is isolated by pouring the melt into hot water, boiling, extracting and finally washing with a little dilute alkali.

As many apparently widely different embodiments of this invention may be made without departing from the spirit and scope thereof, it is to be understood that we do not limit ourselves to the specific embodiments thereof except as defined in the eppended claims.

We claim:

1. Process for the halogenation of intermediates and vat dyes of the anthracene series (including in that expression polynuclear compounds having a system of more than two fused rings) which comprises dissolving or suspending the starting-material in the molten anhydride of a dicarboxylic acid, the said anhydride having a melting-point in the presence of the starting-material below about 180° C. but being solid at ordinary room temperature, and treating the solution or suspension with a halogenating agent at temperatures above the said melting-point.

2. Process according to claim 1 in which the acid anhydride chosen as medium is a phthalic anhydride body.

3. Process for the halogenation of a dibenzanthrone body which comprises treating the dibenzanthrone body in a medium comprising a molten phthalic anhydride body with a halogenating agent at temperatures above the melting-point of the medium in presence of the dibenzanthrone body.

4. Process for the production of pentachlorodibenzanthrone which comprises heating a mixture of dibenzanthrone and molten phthalic anhydride to about 175–180° C. and passing chlorine into the mixture at this temperature until the dibenzanthrone has been substantially all converted into pentachlorodibenzanthrone.

5. Process according to claim 1 followed by removal of the acid anhydride from the reaction mass by extraction with hot water, and recovery of the acid from the wash liquors by cooling, the acid anhydride being chosen so that it is sufficiently soluble in hot water whilst the corresponding acid is sparingly soluble in cold water.

In testimony whereof we affix our signatures.

CECIL SHAW.
ROBERT FRASER THOMSON.
JOHN THOMAS.